(12) United States Patent
Mohammed et al.

(10) Patent No.: US 10,647,903 B2
(45) Date of Patent: *May 12, 2020

(54) OIL-BASED DRILLING FLUID COMPOSITIONS WHICH INCLUDE LAYERED DOUBLE HYDROXIDES AS RHEOLOGY MODIFIERS AND AMINO AMIDES AS EMULSIFIERS

(71) Applicants: Saudi Arabian Oil Company, Dhahran (GB); Durham University, Durham (GB); M-I Drilling Fluids UK Ltd, Aberdeen (GB)

(72) Inventors: Musarrat Halima Mohammed, Glasgow (GB); Andrew Whiting, Durham (GB); Mona Al Batal, Durham (GB); Manohara Gudiyor Veerabhadrappa, Durham (GB); Hugh Christopher Greenwell, County Durham (GB); John Adrian Hall, Dhahran Hills (SA); Gasan Selman Alabedi, Cheshire (GB); Michael Hayward Hodder, Aberdeen (GB)

(73) Assignees: Saudi Arabian Oil Company, Dhahran (SA); Durham University, Durham (GB); M-I Drilling Fluids UK Ltd, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,550

(22) Filed: Aug. 9, 2018

(65) Prior Publication Data

US 2019/0055452 A1  Feb. 21, 2019

Related U.S. Application Data

(60) Provisional application No. 62/545,500, filed on Aug. 15, 2017.

(51) Int. Cl.
  *C09K 8/36* (2006.01)
  *C09K 8/03* (2006.01)
  (Continued)

(52) U.S. Cl.
  CPC ............... *C09K 8/36* (2013.01); *C09K 8/032* (2013.01); *C09K 8/34* (2013.01); *C09K 8/506* (2013.01)

(58) Field of Classification Search
  None
  See application file for complete search history.

(56) References Cited

U.S. PATENT DOCUMENTS

| 22,848 A | 2/1859 | Saml |
| 2,520,551 A | 8/1950 | Kilgore |

(Continued)

FOREIGN PATENT DOCUMENTS

| CA | 2057024 A1 | 11/2009 |
| CN | 103032056 A | 4/2013 |

(Continued)

OTHER PUBLICATIONS

Search Report pertaining to International Patent Application PCT/US2018/046204 dated Oct. 31, 2018.

(Continued)

*Primary Examiner* — John J Figueroa
(74) *Attorney, Agent, or Firm* — Dinsmore & Shohl (57) ABSTRACT

The present application discloses drilling fluid compositions, methods for making drilling fluids, and methods for drilling subterranean wells utilizing the drilling fluids. According to one embodiment, a drilling fluid composition may include an oil phase, an aqueous phase, an emulsifier, and a rheology modifier. The emulsifier may include an (Continued)

amino amide, and the rheology modifier may include a layered double hydroxide, such as Mg/Al-Myristate layered double hydroxide.

20 Claims, 3 Drawing Sheets

(51) Int. Cl.
  *C09K 8/34* (2006.01)
  *C09K 8/506* (2006.01)

(56) References Cited

U.S. PATENT DOCUMENTS

| | | | |
|---|---|---|---|
| 3,125,517 A | 3/1964 | Voda | |
| 3,166,548 A | 1/1965 | Kirkpatrick et al. | |
| 3,600,121 A | 8/1971 | Feldmann | |
| 3,676,344 A | 7/1972 | Kuceski | |
| 3,723,393 A | 3/1973 | Kistner | |
| 3,728,277 A | 4/1973 | Foley | |
| 4,368,276 A | 1/1983 | Park | |
| 4,374,737 A | 2/1983 | Larson et al. | |
| 4,501,672 A | 2/1985 | Connell et al. | |
| 4,664,843 A | 5/1987 | Burba, III et al. | |
| 4,749,563 A | 6/1988 | Georgalas | |
| 4,776,966 A | 10/1988 | Baker | |
| 5,079,203 A | 1/1992 | Pinnavaia et al. | |
| 5,094,778 A | 3/1992 | Burba, III et al. | |
| 5,196,143 A | 3/1993 | Burba, III et al. | |
| 5,250,727 A | 10/1993 | Fried | |
| 5,325,922 A | 7/1994 | Cowan et al. | |
| 5,709,976 A | 1/1998 | Malhotra | |
| 5,869,433 A | 2/1999 | Patel | |
| 5,874,024 A | 2/1999 | Knaus | |
| 6,172,151 B1 | 1/2001 | Johnston et al. | |
| 6,242,389 B1 | 6/2001 | Elliott et al. | |
| 6,365,639 B1 | 4/2002 | Hoy | |
| 6,395,686 B2 | 5/2002 | Crawford | |
| 6,437,031 B1 | 8/2002 | Lensvelt et al. | |
| 6,475,959 B1* | 11/2002 | Lange | C09K 8/032 |
| | | | 252/184 |
| 6,537,662 B1 | 3/2003 | Kamrath et al. | |
| 6,878,198 B1 | 4/2005 | Drappel et al. | |
| 6,894,007 B2 | 5/2005 | Klug et al. | |
| 7,098,351 B2 | 8/2006 | Hoong et al. | |
| 7,278,726 B2 | 10/2007 | Nagai | |
| 7,507,694 B2 | 3/2009 | Shumway et al. | |
| 7,741,248 B2 | 6/2010 | Mueller et al. | |
| 8,071,510 B2 | 12/2011 | Scoggins et al. | |
| 8,501,807 B2 | 8/2013 | You et al. | |
| 9,222,013 B1 | 12/2015 | Champagne et al. | |
| 9,315,621 B2 | 4/2016 | Chen et al. | |
| 9,815,222 B2 | 11/2017 | James et al. | |
| 2002/0009564 A1 | 1/2002 | Hall et al. | |
| 2002/0039666 A1 | 4/2002 | Nakamura | |
| 2003/0009834 A1 | 1/2003 | Ascione et al. | |
| 2003/0130132 A1 | 7/2003 | Grainger et al. | |
| 2003/0130135 A1* | 7/2003 | Hou | B01F 17/0042 |
| | | | 507/200 |
| 2004/0038892 A1 | 2/2004 | Finn et al. | |
| 2005/0048024 A1 | 3/2005 | Looker et al. | |
| 2006/0035999 A1 | 2/2006 | Bedford et al. | |
| 2006/0068086 A1 | 3/2006 | Reece et al. | |
| 2006/0088657 A1 | 4/2006 | Reece et al. | |
| 2006/0293192 A1 | 12/2006 | Lochel | |
| 2007/0034825 A1 | 2/2007 | Wenderoth et al. | |
| 2007/0049500 A1 | 3/2007 | Mueller et al. | |
| 2007/0100040 A1 | 5/2007 | Chen et al. | |
| 2007/0116909 A1 | 5/2007 | Tweed et al. | |
| 2007/0140957 A1 | 6/2007 | Mohanty et al. | |
| 2007/0227404 A1 | 10/2007 | Plank et al. | |
| 2008/0170978 A1* | 7/2008 | Duan | C01F 7/004 |
| | | | 423/306 |
| 2008/0182468 A1 | 7/2008 | Dharmarajan et al. | |
| 2010/0279848 A1* | 11/2010 | Iyi | B01D 53/62 |
| | | | 502/11 |
| 2011/0076607 A1 | 3/2011 | Sugimoto et al. | |
| 2012/0129735 A1 | 5/2012 | Dino et al. | |
| 2012/0322694 A1 | 12/2012 | Monteiro et al. | |
| 2012/0325748 A1 | 12/2012 | Kasher et al. | |
| 2013/0035412 A1 | 2/2013 | Schmitz et al. | |
| 2013/0045898 A1 | 2/2013 | Witters et al. | |
| 2013/0267445 A1 | 10/2013 | Hendrickson | |
| 2014/0081045 A1 | 3/2014 | Reddington et al. | |
| 2014/0121135 A1* | 5/2014 | Gamage | C09K 8/36 |
| | | | 507/131 |
| 2014/0228269 A1 | 8/2014 | Masui et al. | |
| 2014/0231145 A1 | 8/2014 | Kverel et al. | |
| 2014/0255378 A1 | 9/2014 | Watkins et al. | |
| 2014/0329088 A1 | 11/2014 | Friedman et al. | |
| 2015/0175880 A1 | 6/2015 | Parris et al. | |
| 2015/0361325 A1 | 12/2015 | Kimura et al. | |
| 2015/0376490 A1 | 12/2015 | Dino et al. | |
| 2016/0031910 A1 | 2/2016 | Maury et al. | |
| 2016/0138349 A1* | 5/2016 | Hale | E21B 21/066 |
| | | | 210/696 |
| 2017/0037296 A1* | 2/2017 | Kimura | E21B 43/16 |
| 2017/0044421 A1* | 2/2017 | Parvulescu | C09K 8/58 |
| 2017/0081580 A1 | 3/2017 | Maghrabi et al. | |
| 2019/0053993 A1 | 2/2019 | Wilson et al. | |
| 2019/0055460 A1 | 2/2019 | Mohammed et al. | |

FOREIGN PATENT DOCUMENTS

| | | |
|---|---|---|
| CN | 105623629 A | 6/2016 |
| EP | 0047370 A1 | 3/1982 |
| EP | 396983 A1 | 11/1990 |
| EP | 839850 A2 | 5/1998 |
| EP | 0906969 A1 | 9/1998 |
| EP | 945244 A1 | 9/1999 |
| JP | H022848 A | 1/1990 |
| RU | 2231534 C2 | 6/2004 |
| WO | 9523823 A1 | 9/1995 |
| WO | 0012458 A1 | 3/2000 |
| WO | 01/49406 A1 | 7/2001 |
| WO | 2004069240 A2 | 8/2004 |
| WO | 2014052510 A1 | 4/2014 |
| WO | 2014102602 A2 | 7/2014 |
| WO | 2015174974 A1 | 11/2015 |
| WO | 2016141968 A1 | 9/2016 |
| WO | 2017055789 A2 | 4/2017 |

OTHER PUBLICATIONS

Search Report pertaining to International Patent Application PCT/US2018/046009 dated Oct. 31, 2018.

Search Report pertaining to International Patent Application PCT/US2018/045569 dated Oct. 25, 2018.

Search Report pertaining to International Patent Application PCT/US2018/045907 dated Nov. 27, 2018.

Costantino U. et al. "Preparation and characterization of hydrotalcite/carboxyadamantane intercalation compounds as fillers of polymeric nanocomposites" Journal of Materials Chemistry, Dec. 22, 2006, pp. 1079-1086, vol. 17, No. 11.

International Search Report and Written Opinion pertaining to International Patent Application PCT/US2018/046220 dated Nov. 27, 2018.

International Search Report and Written Opinion dated Dec. 20, 2018 pertaining to International Patent Application PCT/US2018/046226.

International Search Report and Written Opinion dated Oct. 24, 2018 pertaining to International Patent Application PCT/US2018/045765.

Abdo, et al., "Clay nanoparticles modified drilling fluids for drilling of deep hydrocarbon wells", Applied Clay Science, vol. 86, pp. 76-82, 2013.

Abdou, et al., "Evaluation of Egyptian bentonite and nano-bentonite as drilling mud", Egyptian Journal of Petroleum, vol. 22, pp. 53-59, 2013.

(56) References Cited

OTHER PUBLICATIONS

Al-Salihi, "Synthesis of layered double hydroxide and their application in DSC", International Journal of Scientific & Engineering Research, vol. 7, Issue 1, pp. 694-698, Jan. 2016.
Askinadze et al., "Engineering of new crosslinked functional PEG micrometer-sized particles of narrow size distribution for enzyme immobilization", Polymer 54, pp. 2926-2934, 2013.
Ayawei et al., "Synthesis, Characterization and Application of Mg/Al Layered Double Hydroxide for the Degration of Congo Red in Aqueous Solution", Open Journal of Physical Chemistry, vol. 5, pp. 55-70, 2015.
Baruah et al., "The effect of particle size of clay on the viscosity build up property of mixed metal hydroxides (MMH) in the low solid-drilling mud compositions", Applied Clay Science, 80-81, pp. 169-175, 2013.
Dardir et al., "Preparton and evaluation of some esteramides as synthetic based drilling fluids", Egyptian Journal of Petroleum, vol. 23, pp. 35-43, 2014.
Dyer et al., "Synthesis and Structure of Phophatidylinositol Dimannoside", J. Org. Chem., vol. 72, pp. 3282-3288, 2007.
Eissa et al., "Synthesis of nonionic polymeric surfactants with amide oxime terminal groups", Journal of Basic and Environmental Sciences 4, pp. 94-106, 2017.
Fruijtier-Polloth, "Safety assessment on polyethylene glycols (PEGs) and their derivatives as used in cosmetic products", Toxicology 214, pp. 1-38, 2005.
Gluz et al., "Synthesis and characterization of new poly(ethylene glycol)bisphosphonate vinylic monomer and non-fluorescent and NIR-fluorescent bisphosphonate micrometer-sized particles", Polymer 54, pp. 565-571, 2013.
Growcock et al., "The Revolution in Non-Aqueous Drilling Fluids", AADE-11-NTCE-33, presentation at the 2011 AADE National Technical Conference and Exhibition, 2011.
Hiermoso, et al., "Influence of viscosity modifier nature and concentratio non the viscous flow behaviour of oil-based drilling fludis at high pressure", Applied Clay Science 87, pp. 14-21, 2014.
Li, et al., "A new type of whole oil-based drilling fluid", Petroleum Exploration and Development, vol. 41, Issue 4, Aug. 2014.
Kim et al., "Thermal Evolution of the Structure of a Mg—Al—Co3 Layered Double Hydroxide: Sorption Reversibility Aspects", Ind. Eng. Chem. Res, vol. 43, pp. 4559-4570, 2004.
Krauss, et al., "Synthesis and Biological Evaluation of New Niphathesine Analogues", Arch. Pharm. Chem. Life Sci., 340, pp. 154-158, 2007.
Li, et al., "Rheological properties of hydrotalcite-like compounds/ montmorillonite suspensions", Colloids and Surfaces A: Physichochem. Eng. Aspects, 304, pp. 14-17, 2007.
Liyi et al., "Effect of Gas Hydrate Drilling Fluids Using Low Solid Phase Mud System in Plateau Permafrost", Procedia Engineering 73, pp. 318-325, 2014.
Mao et al., "Hydrophobic associated polymer based silica nanoparticles composite with core-shell structure as a filtrate reducer for drilling fluid at ultra-high temperature", Journal of Petroleum Science and Engineering 129, pp. 1-14, 2015.
Mizrahi et al., "Novel Poly(ethylene glycol) Monomers Bearing Diverse Functional Groups", j. Polym. Sci., Part A: Polym. Chem. 48, pp. 5468-5478, 2010.
Ning et al., "Gas-hydrate formation, agglomeration and inhibition in oil-based drilling fluids for deep-water drilling", Journal of Natural Gas Chemistry 19, pp. 234-240, 2010.
Pivnicka et al., "Pressure gradient prediction of time-dependent drilling fluids and the effect of acceleration", Journal of Petroleum Science and Engineering 135, pp. 246-252, 2015.
Sakai et al., "Quaternary Ammonium-Type Gemini Surfactants Synthesized from Oleic Acid: Aqueous Solution Properties and Adsorption Characteristics", Journal of Oleo Science, vol. 62, No. 7, pp. 489-498, 2013.

Strachan, "Developing a High-Performance Oil-Base Fluid for Exploration Drilling", Oilfield Review Spring, vol. 26, No. 1, pp. 26-33, 2014.
Stanimirova et al., "Thermal evolution of Mg—Al—CO3 hydrotalcites", Clay Materials, vol. 39, pp. 177-191, 2004.
Tang, Boric Acid Catalyzed Amide Formation From Carboxylic Acids and Amines: N-Benzyl-4-Phenylbutyramide (Benzenbutanamide, N-(phenylmethyl)-), Organic Syntheses, vol. 81, pp. 262-272, 2005.
Traverso-Soto et al., "Distribution of anionic and nonionic surfactants in a sewage-impacted Mediterranean costal lagoon: Inputs and seasonal variations", Science of the Total Environment 503-504, pp. 87-96, 2015.
Vandevoorde et al., "Modifications of the Ethanolamine Head in N-Palmitoylethanolamine: Synthesis and Evaluation of New Agents Interfering with the Metabolism of Anandamide", J. Med. Chem. 46, pp. 1440-1448, 2003.
Vinardell et al., "The relationship between the chain length of non-ionic surfactants and their hemolytic action on human erythrocytes", Comparative Biochemistry and Physiology Part C 124, pp. 117-120, 1999.
Veronese et al., "The Impact of PEGylation of Biological Therapies", Buidrugs, vol. 22, Issue 5, pp. 315-329, 2008.
Wang et al., "New synthetic route to Mg—Al—CO3 layered double hydroxide using magnesite", Materials Research Bulletin 48, pp. 1228-1232, 2013.
Ying, "Fate, behavior and effects of surfactants and their degration products in the environment", Environment International 32, pp. 417-431, 2006.
Yldrim, "Metallic magnesium: an efficient catalyst toward N-aryl and N-alkyl substituted amides directly from aliphatic carboxylic acids", Monatsch Chem 146, pp. 947-951, 2015.
Zamanian et al., "Layered double hydroxides intercalated by long chain anions as oil phase gelling agent", Indian Journal of Chemical Technology, vol. 23, pp. 485-490, Nov. 2016.
Zhong et al., "Synergistic stabilization of shale by a mixture of polyamidomaine dendrimers modified bentonite with various generations in water-based drilling fluid", Applied Clay Science 114, pp. 359-369, 2015.
Zhuang et al., "Comparative study on the use of cationic-nonionic-organo-montmorillonite in oil-based drilling fluids", Applied Clay Science 1160117, pp. 257-262, 2015.
Search Report pertaining to International Patent Application PCT/US2018/045927 dated Oct. 30, 2018.
Office Action dated Sep. 20, 2019 pertaining to U.S. Appl. No. 16/055,881, filed Aug. 6, 2018, 28 pgs.
Office Action dated Sep. 20, 2019 pertaining to U.S. Appl. No. 16/055,867, filed Aug. 6, 2018, 28 pgs.
Office Action dated Sep. 19, 2019 pertaining to U.S. Appl. No. 16/059,558 filed Aug. 9, 2018, 28 pgs.
Examination Report dated Dec. 28, 2019 pertaining to GCC Application No. 2018-35835, filed Aug. 14, 2018, 3 pgs.
Office Action dated Dec. 31, 2019 pertaining to U.S. Appl. No. 16/057,367 filed Aug. 7, 2018, 39 pgs.
Liang, et al. "Direct Synthesis of Unilamellar MgAl-LDH Nanosheets and Stacking in Aqueous Solution" Langmuir 2015, 31, 45, 12464-12471: (Year: 2015).
Constantino, et al. "Basis Properties of Mg2+1-x layered Double Hydroxides Intercalated by Carbonate, Hydroxide, Chloride and Sulfate Anions" (Year: 1994).
Notice of Allowance and Fee(s) Due dated Jan. 31, 2020 pertaining to U.S. Appl. No. 16/055,881 filed Aug. 6, 2018, 12 pgs.
Notice of Allowance and Fee(s) Due dated Jan. 17, 2020 pertaining to U.S. Appl. No. 16/059,558 filed Aug. 9, 2018, 11 pgs.
Notice of Allowance and Fee(s) Due dated Jan. 17, 2020 pertaining to U.S. Appl. No. 16/059,867 filed Aug. 6, 2018, 9 pgs.
Office Action dated Feb. 3, 2020 pertaining to U.S. Appl. No. 16/057,378 filed Aug. 7, 2018, 10 pgs.
Office Action dated Feb. 21, 2020 pertaining to U.S. Appl. No. 16/100,829 filed Aug. 10, 2018, 8 pgs.

* cited by examiner

OIL-BASED DRILLING FLUID COMPOSITIONS WHICH INCLUDE LAYERED DOUBLE HYDROXIDES AS RHEOLOGY MODIFIERS AND AMINO AMIDES AS EMULSIFIERS

CROSS REFERENCE TO RELATED APPLICATIONS

This application claims the benefit of U.S. Provisional Application Ser. No. 62/545,500 filed Aug. 15, 2017.

TECHNICAL FIELD

Embodiments of the present disclosure generally relate materials and methods utilized in natural resource wells and, more specifically, to oil-based drilling fluids for use in high pressure and high temperature drilling operations.

ABBREVIATIONS

Throughout the present disclosure, the following units of measurement or other abbreviated terms are as follows:
°=degrees;
° C.=degrees Celsius;
° F.=degrees Fahrenheit;
%=percent;
Al=Aluminum;
cP=centiPoise;
Ex.=Example;
FIG.=Figure;
g=gram;
h=hour;
G'=storage modulus;
G"=loss modulus;
HTHP=high temperature, high pressure;
mmol=milimole;
mg=miligrams;
Mg=Magnesium;
mL=milliliter;
MPa=megaPascals;
psi=pounds per square inch;
Pa·s=Pascal seconds;
$s^{-1}$=inverse seconds; and
wt. %=weight percent.

BACKGROUND

Drilling operations to drill a new wellbore for hydrocarbon extraction, for example, include the common practice of continuously circulating a drilling fluid (alternatively known as a drilling mud) through the wellbore during the drilling operation. The drilling fluid is pumped into the drill pipe and to the bottom of the borehole, where the drilling fluid then flows upwardly through an annular space between the wellbore wall and the drill pipe, and finally returns to the surface and flows out of the wellbore, where it is recovered for secondary processing. During drilling, the drilling solids, such as portions of the drilled geological formation, may be carried by the drilling fluid from at or near the bottom of the wellbore to the surface. After its return to the surface, the drilling fluid may be mechanically or chemically treated to remove captured solids and drill cuttings from the drilling fluid before recirculation back through the wellbore.

SUMMARY

In some drilling processes, the drilling fluid experiences a relatively wide variety of environments, based on factors such as the surrounding temperature as well as the physical strain applied to the drilling fluid. For example, the strain exerted on the drilling fluid can vary based on whether the drilling fluid is in circulation or, alternatively, in a stagnant state (for example, when the drilling has halted). Additionally, a drilling fluid may experience relatively low temperatures at or near the surface of the wellbore (such as near the air temperature at the surface), but may experience high pressure, high temperature (HPHT) environmental conditions deeper in the geological formation. As wellbores are increased in depth, the pressure and temperature at the base of the wellbore may be elevated. The industry-defined definition of HPHT conditions typically include a wellbore temperature greater than 300° F. (149° C.) and a wellbore pressure greater than 10,000 psi (68.9 MPa).

Given the circulating nature of drilling fluid and its functionality in capturing solids and cuttings during drilling operations, drilling fluids should be free-flowing with a relatively low viscosity during circulation in order to facilitate economical pumping, while having sufficient substance to retain and transport the cuttings and other solids and to suspend the weight material so as to maintain a mud column of uniform density in the wellbore during static and circulating conditions. The drilling fluid should also have a gel strength sufficient to suspend the solids and cuttings if circulation of the drilling fluid is stopped to prevent accumulation of solids at the bottom of the wellbore. Solids accumulating at the bottom of the wellbore would potentially result in jamming of the drill as well as physical blockage of the drilling fluid's flow path.

However, developing drilling fluids which can operate in HPHT environments is challenging. Elevated temperatures may have a detrimental effect upon some drilling fluids with breakdown of components unable to sustain the elevated temperatures. Additionally, at elevated temperatures some drilling fluids may begin to solidify or experience viscosity increases that may impede circulation. Additionally, drilling fluids which are suitable for HPHT environments may not adequately operate in non-HPHT environments, such as at temperatures experienced at the surface and at low-depth portions of the wellbore. At these relatively low temperatures, conventional drilling fluids may have relatively high viscosity both when experiencing relatively little strain (such as when drilling and fluid circulation has halted) as well as when experiencing relatively great amounts of strain (such as when drilling is ongoing and the drilling fluid is circulating.

Thus, there are ongoing needs for drilling fluids that are thermally stable under HPHT conditions while providing suitable rheological properties at relatively low temperatures, such as those experienced when surface temperatures are relatively low (for example, at or below 0° C. such as in the Arctic). For example, desirable drilling fluids, such as those presently described, may have a lesser viscosity a temperature of 0° C. for varying applied shear stresses than some conventional drilling fluids. Therefore, the presently described drilling fluids may require less energy to circulate while having acceptable solids holding properties while drilling has ceased. Without being bound by theory, it is believed that the incorporation of particular rheology modifiers, emulsifiers, or both, may contribute to the desirable rheological properties found the presently disclosed drilling fluids. Specifically, the incorporation of a layered double hydroxide as a rheology modifier, an amino amide as an emulsifier, or both, may promote rheological properties in the drilling fluid which are favorable for drilling in particular environments, such as at or near freezing surface temperatures and where an HPHT environment is present at the bottom of the wellbore.

According to one or more embodiments, an oil-based drilling fluid composition may comprise a base oil, water, a rheology modifier, an emulsifier, and one or more additives chosen from wetting agents, fluid-loss control additives, and weighting additives. The base oil may be in an oil phase and the water may be in an aqueous phase. The rheology modifier may comprise a layered double hydroxide. The emulsifier may comprise an amino amide having the formula R—CO—NH—R'—NH—R"—NH$_2$.

According to another embodiment, an oil-based drilling fluid composition may be made by a method comprising mixing a base oil, a water-containing component, an emulsifier, and a rheology modifier to form an oil-based drilling fluid composition. The oil-based drilling fluid composition may comprise an oil phase comprising the base oil and an aqueous phase comprising water. The rheology modifier may comprise a layered double hydroxide. The emulsifier may comprise an amino amide having the formula R—CO—NH—R'—NH—R"—NH$_2$.

According to yet another embodiment, a subterranean well may be drilled by a method comprising providing an oil-based drilling fluid composition, and operating a drill in a wellbore in the presence of the oil-based drilling fluid composition. The oil-based drilling fluid composition may comprise a base oil in an oil phase, water in an aqueous phase, a rheology modifier, an emulsifier, and one or more additives chosen from wetting agents, fluid-loss control additives, and weighting additives. The rheology modifier may comprise a layered double hydroxide. The emulsifier may comprise an amino amide having the formula R—CO—NH—R'—NH—R"—NH$_2$.

Additional features and advantages of the described embodiments will be set forth in the detailed description which follows, and in part will be readily apparent to those skilled in the art from that description or recognized by practicing the described embodiments, including the detailed description which follows and the claims.

BRIEF DESCRIPTION OF THE FIGURES

The following detailed description of the illustrative embodiments can be understood when read in conjunction with the following drawings.

DETAILED DESCRIPTION

Embodiments of the present disclosure are directed to emulsifiers and rheology modifiers for oil-based drilling fluids and, additionally, to oil-based drilling fluid compositions incorporating the disclosed emulsifiers and rheology modifiers. The oil-based drilling fluid is a combination of a continuous oil phase, an aqueous phase, and at least one emulsifier. The emulsifier may comprise an amino amide, such as an emulsifier having the formula R—CO—NH—R'—NH—R"—NH$_2$. The rheology modifier may include a layered double hydroxide, such as Mg/Al-Myristate layered double hydroxide. For convenience, the amino amide emulsifier having the formula R—CO—NH—R'—NH—R"—NH$_2$ is alternatively also referred to as the "Formula 1" emulsifier throughout this disclosure.

To drill a subterranean well, a drill string, including a drill bit and drill collars to weight the drill bit, is inserted into a predrilled hole and rotated to cause the drill bit to cut into the rock at the bottom of the hole. The drilling operation produces rock fragments. To remove the rock fragments from the bottom of the wellbore, a drilling fluid, such as the oil-based drilling fluid composition, is pumped down through the drill string to the drill bit. The drilling fluid cools the drill bit, provides lubrication, and lifts the rock fragments known as cuttings away from the drill bit. The drilling fluid carries the cuttings upwards as the drilling fluid is re-circulated back to the surface. At the surface, the cuttings are removed from the drilling fluid through a secondary operation, and the drilling fluid may be re-circulated back down the drill string to the bottom of the wellbore for collection of further cuttings. It will be appreciated by one skilled in the art that multiple terms familiar to those skilled in the art may be used to describe the same item. For example, a subterranean well may alternatively be called a well or wellbore and usage of a single term is meant to encompass each of the related terms as well.

Drilling fluids include drilling muds, packer fluids, suspension fluids, and completion fluids. Generically, drilling fluids serve a number of functions, with different types specializing in particular functions. In one or more embodiments, the oil-based drilling fluid composition suspends the cuttings and weighting material transports the cutting to the wellbore surface with the oil-based drilling fluid composition. Additionally, the oil-based drilling fluid composition may absorb gases in the wellbore, such as carbon dioxide ($CO_2$), hydrogen sulfide ($H_2S$), and methane ($CH_4$), and transport them to the wellbore surface for release, sequestration, or burn-off. The oil-based drilling fluid composition may additionally provide buoyancy to the drill string, relieving the tension on the drill string as the length of the wellbore increases. In one or more embodiments, the oil-based drilling fluid composition also provides a cooling and lubrication functionality for cooling and lubrication of the bit and drill string utilized in boring operations. In other embodiments, the oil-based drilling fluid composition also controls subsurface pressures. Specifically, the oil-based drilling fluid composition may provide hydrostatic pressure in the wellbore to provide support to the sidewalls of the wellbore and prevent the sidewalls from collapsing and caving in on the drill string. Additionally, the oil-based drilling fluid composition may provide hydrostatic pressure in the bore to prevent fluids in the downhole formations from flowing into the wellbore during drilling operations.

Under certain extreme downhole conditions, such as excessive temperature or difficult formations, some of the properties of the drilling fluid may be altered. For example, interaction of a drilling fluid with a formation having swelling or dispersible clays, or both, or subjecting the drilling fluid to extreme downhole temperatures may cause the drilling fluid to thicken or thin, excessively increase or decrease in viscosity, or any combination of these. For example, a drilling fluid utilized in a high pressure and high temperature (HPHT) operations may experience a wellbore temperature greater than 300° F. (approximately 149° C.) and a wellbore pressure greater than 10,000 psi (approximately 68.9 MPa) which is the industry-defined definition of HPHT conditions. Under HPHT conditions, conventional drilling fluids may decompose or experience undesirable changes in rheology. In additional embodiments, the presently disclosed drilling fluids may desirably perform even under undesirable downhole conditions such as gas influx, which may thin or chemically destabilize a drilling fluid, or evaporite formation, which may destabilize a drilling fluid.

Embodiments of the oil-based drilling fluid composition are formulated to provide improved rheology. Specifically, the oil-based drilling fluid composition may be formulated to comprise a similar or greater viscosity at low shear rates than conventional HPHT oil-based drilling fluids, a lesser or similar viscosity at high shear rates, or both, than conventional HPHT oil-based drilling fluids. The greater viscosity at low shear rates enables the oil-based drilling fluid composition to effectively hold cuttings when drilling operations are halted. Conversely, the lesser viscosity at high shear rates necessitates less power for circulation of the oil-based drilling fluid composition during drilling operations. As presently described, a low shear rate may describe, for example, a shear rate of less than or equal to 10 $s^{-1}$ and a high shear rate may describe, for example, a shear rate of greater than or equal to 100 $s^{-1}$.

In one or more embodiments, the oil phase includes a base oil. The oil phase of the oil-based drilling fluids may include a synthetic oil or natural petroleum product as the base oil. The natural petroleum-derived product may include oils such as a diesel oil or a mineral oil. The synthetic oil may comprise an ester or olefin. Further, the synthetic oil or natural petroleum product may be composed of hydrocarbons such as n-paraffins, iso-paraffins, cyclic alkanes, branched alkanes, or mixtures thereof. For example, the base oil may comprise C8 to C26 linear or branched saturated alkyl hydrocarbons, such as found in Saraline 185V commercially available from Shell. Additional base oils may include, without limitation, DF-1 and EDC 99-DW, available from Total, and Escaid 110, available from Exxon Mobil. Additional suitable base oils may include one or more of mineral oil, paraffins, or diesel oil. In various embodiments, the oil-based drilling fluid composition may include from 5 wt. % to 45 wt. %, such as from 5 wt. % to 30 wt. %, from 5 wt. % to 20 wt. %, from 5 wt. % to 15 wt. %, from 5 wt. % to 10 wt. %, from 10 wt. % to 45 wt. %, from 15 wt. % to 45 wt. %, from 20 wt. % to 45 wt. %, from 30 wt. % to 45 wt. %, from 5 wt. % to 25 wt. %, or from 10 wt. % to 20 wt. % base oil based on the total weight of the oil-based drilling fluid composition.

The aqueous phase of the oil-based drilling fluid may include water and a salt source. In one or more embodiments, the water includes one or more of deionized, tap, distilled or fresh waters; natural, brackish and saturated salt waters; natural, salt dome, hydrocarbon formation produced or synthetic brines; filtered or untreated seawaters; mineral waters; and other potable and non-potable waters containing one or more dissolved salts, minerals or organic materials. In some embodiments, the aqueous phase may comprise a salt brine made up of water and a salt chosen from one or more of calcium chloride, calcium bromide, sodium chloride, sodium bromide, and combinations thereof, for example. The oil-based drilling fluid may contain from 2 wt. % to 10 wt. % aqueous phase, based on the total weight of the oil-based drilling fluid. In various embodiments, the oil-based drilling fluid composition may have from 2 wt. % to 12 wt. %, such as from 4 wt. % to 10 wt. %, from 2 wt. % to 8 wt. %, from 2 wt. % to 6 wt. %, from 2 wt. % to 5 wt. %, from 3 wt. % to 10 wt. %, from 3 wt. % to 8 wt. %, from 3 wt. % to 6 wt. %, from 4 wt. % to 10 wt. %, from 4 wt. % to 8 wt. %, from 4 wt. % to 6 wt. %, or from 4 wt. % to 5 wt. % aqueous phase, based on the total weight of the oil-based drilling fluid composition. In some embodiments, the oil-based drilling fluid may have an oil-to-water ratio by volume of from 50:50 to 95:5, from 75:20 to 95:5, from 85:15 to 95:5, or from 90:10 to 95:5, for example. The oil-to-water ratio of the oil-based drilling fluid composition is the volumetric ratio calculated as Oil:water=base oil+ surfactant(s)+emulsifier(s)+wetting agent(s)+oil portions of the layered double hydroxide: water+water portion of the brine. As an example and without limitation, where brine may be X % water by volume, X % of the brine volume is included as water volume.

The oil-based drilling fluid includes at least one emulsifier. The emulsifier may assist in the formation of an emulsion of the aqueous phase of the oil-based drilling fluid composition within the oil phase of the oil-based drilling fluid composition. The inclusion of the emulsifier in the oil-based drilling fluid compositions may help prevent separation of the oil phase and the aqueous phase.

In one or more embodiments, the emulsifier comprises an amino amide. An amino amide may be any molecule comprise an amino functionality (—NH$_2$) and an amide functionality. In some embodiments, the amino amide may comprise the structure depicted in Chemical Structure 1.

Chemical Structure 1

The amino amide of Chemical Structure 1 may be referred to as the "Formula 1 emulsifier" or the molecule comprising the formula R—CO—NH—R'—NH—R"—NH$_2$.

In one or more embodiments, the amount of the Formula 1 emulsifier in the drilling fluid composition may be from 0.05 weight percentage (wt. %) to 5 wt. %, from 0.1 wt. % to 2 wt. %, from 0.1 wt. % to 1.5 wt. %, from 0.1 wt. % to 1 wt. %, from 0.5 wt. % to 2.5 wt. %, from 0.5 wt. % to 2 wt. %, from 0.5 wt. % to 1.5 wt. %, from 0.5 wt. % to 1 wt. %, from 0.75 wt. % to 2.5 wt. %, from 0.75 wt. % to 2 wt. %, from 0.75 wt. % to 1.5 wt. %, from 0.75 wt. % to 1 wt. %, from 0.8 wt. % to 1.1 wt. %, from 0.8 wt. % to 1 wt. %, or from 0.9 wt. % to 1.1 wt. %, based on the total weight of the drilling fluid composition. The oil-based drilling fluid may include additional emulsifiers. Additional example emulsifiers include fatty acids, invert emulsifier, and oil-wetting agent for synthetic based drilling fluid systems such as LE SUPERMUL™ commercially available from Halliburton Energy Services, Inc. and MUL XT commercially available from M-I SWACO. LE SUPERMUL™ is a carboxylic acid terminated polyamide.

In one or more embodiments, the total amount of the emulsifier in the drilling fluid composition including both the Formula 1 emulsifier and additional emulsifiers may be from 0.05 wt. % to 5 wt. %, from 0.1 wt. % to 2.5 wt. %, from 0.1 wt. % to 1.5 wt. %, from 0.1 wt. % to 1 wt. %, from 0.5 wt. % to 2.5 wt. %, from 0.5 wt. % to 2 wt. %, from 0.5 wt. % to 1.5 wt. %, from 0.5 wt. % to 1 wt. %, from 0.75 wt. % to 2.5 wt. %, from 0.75 wt. % to 2 wt. %, from 0.75 wt. % to 1.5 wt. %, from 0.75 wt. % to 1 wt. %, from 0.8 wt. % to 1.1 wt. %, from 0.8 wt. % to 1 wt. %, or from 0.9 wt. % to 1.1 wt. %, based on the total weight of the drilling fluid composition.

In one or more embodiments, the R group in the amino amide comprising the formula R—CO—NH—R'—NH—R"—NH$_2$ comprises a hydrocarbyl group. As described, a "hydrocarbyl group" refers to a group formed by removing one or more hydrogen atoms from a hydrocarbon (i.e., removing one hydrogen from a group connected at one point to the backbone structure, such as R, removing two hydrogens from a group connected at two points to the backbone structure, such as R' and R", etcetera. For example, the R group may be a straight chained or branched hydrocarbyl group comprising one or more of alkane, alkene, alkyne, aromatic, cyclic terpene, and alicyclic functional groups. In One or more embodiments the R group may be a straight chained aliphatic alkyl group that includes from 1 to 100 carbon atoms (such as, for example, from 1 to 50 carbon atoms, from 1 to 25 carbon atoms, from 10 to 25 carbon atoms, from 15 to 20 carbon atoms, or from 16 to 18 carbon atoms. For example, in one embodiment, the R group may be —C$_{17}$H$_{35}$. In another embodiment, the R group may be a straight chained unsaturated hydrocarbyl group comprise an akene group that includes from 1 to 100 carbon atoms (such as, for example, from 1 to 50 carbon atoms, from 1 to 25 carbon atoms, from 10 to 25 carbon atoms, from 15 to 20 carbon atoms, or from 16 to 18 carbon atoms. For example, the RE group may be —C$_7$H$_{14}$CHCHC$_8$H$_{17}$.

In one or more embodiments, the R' group, the R" group, or both, may comprise a straight chained hydrocarbyl group, such as an alkyl group or an alkenyl group. The R' group, R" group, or both, may include from 1 to 20 carbon molecules, such as from 1 to 10 carbon atoms, from 1 to 5 carbon atoms, or from 1 to 3 carbon atoms. For example, the R' group, the R" group, or both, may comprise a two carbon alkyl group (that is, —CH$_2$CH$_2$—).

According to one embodiment, the Formula 1 emulsifier may have an R group of —C$_{17}$H$_{35}$, and R' and R" groups of —CH$_2$CH$_2$—. Such an embodiment is depicted as Chemical Structure 2.

Chemical Structure 2

In embodiments, the oil-based drilling fluid composition includes a rheology modifier. For example, the rheology modifier may be a viscosifier to impart non-Newtonian fluid rheology to the oil-based drilling fluid composition to facilitate lifting and conveying rock cuttings to the surface of the wellbore. In one or more embodiments, the oil-based drilling fluid may include a layered double hydroxide, such as Mg/Al-Myristate layered double hydroxide, as a rheology modifier. As used in the present disclosure, a layered double hydroxide refers to ionic solid materials having the generic layer sequence [ACBZADB]$_n$, where the C and D layers represents metal cations, the A and B layers represent hydroxide anion layers, Z represents another ionic layer, and n represents the number of repeating units in the structure. According to one or more embodiments, the C and D layers may include different metal cations. For example, the C layer may include magnesium cations, such as divalent magnesium cations, and the D layer may include aluminum cations, such as trivalent aluminum cations. However, other metal cations are contemplated in the present disclosure, such as any metal which may form a cation. For example, and without limitation, cations of Li, Zn, Co, Ni, Ca, Fe, or Ga could be included in the layered double hydroxide. The Z layer may include myristate, which is a salt or ester of myristic acid. Myrisitic acid has the general formula (CH$_3$)(CH$_2$)$_{12}$COOH, and the myristate ion, included in the layered double hydroxide, may have the general formula (CH$_3$)(CH$_2$)$_{12}$COO$^-$. According to one or more embodiments, the layered double hydroxide has the formula:

where x is from 0.1 to 0.33, and Y represents the ionic charge of the metal cations and myristate anions.

According to one or more embodiments, layered double hydroxides can be fabricated by a process comprising mixing cationic salts and myristate salt in water, and subsequently hydrothermally treating the mixture at elevated temperatures such as at least 100° C., at least 125° C. or even at 150° C. or greater (for example, from 100° C. to 200° C.) for time periods of from 4 hours to a week, such as from 6 hours to 48 hours. Following reaction by hydrothermal processing, the double layered hydroxide may be separated from other substances by dispersing the reaction products in a solvent, such as acetone, and optionally stirring at room temperature for at least 1 minute, such as for a time period of from 15 minutes to 45 minutes. Following the acetone treatment, the double layered hydroxide can be recovered by heating to an elevated temperature in an oven followed by washing with hot water.

In one or more embodiments, the double layered hydroxide may comprise magnesium and aluminum, and the molar ratio of magnesium to aluminum may be from 0.5 to 10, such as from 1 to 5. In additional embodiments, the molar ratio of myristate to total metal cations may be from 1 to 3, such as from 1 to 2, or 1.5. According to one or more embodiments, the layered double hydroxide may be prepared by utilizing precursor materials of Mg(NO$_3$)$_2$.6H$_2$O, Al(NO$_3$)$_3$.9H$_2$O, urea, and sodium myristate.

According to embodiments, the layered double hydroxide may be the only rheology modifier included in the oil-based drilling fluid or, alternatively, other rheology modifiers may be included in the oil-based drilling fluid. Examples of additional viscosifiers may include, but are not limited to, sepiolite, polyamide, dimeric or trimeric fatty acids, or combinations of these viscosifiers. In some embodiments, the oil-based drilling fluid composition may optionally include an organophilic hectorite clay, for example, VERSAGEL HT commercially available from MI-SWACO, Houston, Tex., or an organophilic clay, for example Bentone® 42 commercially available from Elements Specialties Inc, Highstown, N.J.

An example oil-based drilling fluid composition may include from 0.1 wt. % to 0.8 wt. % of a rheology modifier based on the total weight of the oil-based drilling fluid composition. In some embodiments, the oil-based drilling fluid composition may include from 0.1 wt. % to 0.7 wt. % of a layered double hydroxide, such as Mg/Al-Myristate layered double hdyroxide. For example, at least 0.1 wt. %, at least 0.2 wt. %, at least 0.3 wt. %, at least 0.4 wt. %, at least 0.5 wt. %, at least 0.6 wt. %, at least 0.7 wt. %, or at least 0.8 wt. % of the oil-based drilling fluid may be rheology modifier.

The oil-based drilling fluid composition also includes one or more additives. Example additives include, without limitation, wetting agents, fluid-loss control additives, and weighting additives. The oil-based drilling fluid composition may also optionally include alkalinity adjusters, electrolytes, glycols, glycerols, dispersion aids, corrosion inhibitors, defoamers, and other additives or combinations of additives.

In embodiments, the oil-based drilling fluid composition may include a weighting additive to increase the weight, the density, or both, of the oil-based drilling fluid. Weighting additives may be used to control formation pressures and to help combat the effects of sloughing or heaving shales that may be encountered in stressed areas. Any substance that is denser than water and that does not adversely affect other properties of the drilling fluid can be used as a weighting material. In some embodiments, the weighting material may be a particulate solid having a specific gravity (SG) sufficient to increase the density of the drilling fluid composition by a certain amount without adding excessive weighting material such that the drilling fluid composition cannot be circulated through the wellbore. The weighting material may have a specific gravity (SG) of from 2 grams per cubic centimeter ($g/cm^3$) to 6 $g/cm^3$. Examples of weight adjusting or density adjusting agents include barite ($BaSO_4$), galena (PbS), hematite ($Fe_2O_3$), magnetite ($Fe_3O_4$), manufactured iron oxide, ilmenite ($FeO.TiO_2$), siderite ($FeCO_3$), celesite ($SrSO_4$), dolomite ($CaCO_3.MgCO_3$), and calcite ($CaCO_3$).

The oil-based drilling fluid composition may include an amount of weighting additive sufficient to increase the density of the drilling fluid composition to allow the drilling fluid composition to support the wellbore and prevent fluids in downhole formations from flowing into the wellbore. In embodiments, the oil-based drilling fluid composition may include from 1 wt. % to 80 wt. % weighting additive based on the total weight of the oil-based drilling fluid composition. In some embodiments, the oil-based drilling fluid composition may include from 1 wt. % to 90 wt. %, from 20 wt. % to 80 wt. %, from 20 wt. % to 75 wt. %, from 50 wt. % to 80 wt. %, from 50 wt. % to 75 wt. %, from 60 wt. % to 80 wt. %, from 60 wt. % to 75 wt. %, from 65 wt. % to 80 wt. %, or from 70 wt. % to 80 wt. % weighting additive based on the total weight of the oil-based drilling fluid composition. In some embodiments, the oil-based drilling fluid composition may include from 50 wt. % to 90 wt. % weighting additive based on the total weight of the oil-based drilling fluid composition.

The oil-based drilling fluid composition may optionally include at least one alkalinity adjuster. In embodiments, the oil-based drilling fluid composition may optionally include at least one alkaline compound to adjust the pH of the oil-based drilling fluid composition. Examples of alkaline compounds may include, but are not limited to, lime (calcium hydroxide or calcium oxide), soda ash (sodium carbonate), sodium hydroxide, potassium hydroxide, other strong bases, or combinations of these alkaline compounds. It is noted that conjugate bases to acids with a $pK_\alpha$ of more than about 13 are considered strong bases. The alkaline compounds may react with gases, such as $CO_2$ or $H_2S$ for example, encountered by the drilling fluid composition during drilling operations to prevent the gases from hydrolyzing components of the water-based drilling fluid composition. Some example water-based drilling fluid compositions may optionally include from 0.1 wt. % to 3 wt. %, 0.4 wt. % to 2 wt. %, or 0.6 wt. % to 0.8 wt. % lime.

In one or more embodiments, surfactants such as wetting agents may be added to enhance the stability of suspensions or emulsions in the oil-based drilling fluid composition. Suitable wetting agents may include fatty acids, organic phosphate esters, modified imidazolines, amidoamines, alkyl aromatic sulfates, and sulfonates. For example, SUREWET®, which is commercially available from M-I SWACO, Houston, Tex., is an oil based wetting agent and secondary emulsifier that may be used to wet fines and drill solids to prevent water-wetting of solids. Moreover, SUREWET® may improve thermal stability, rheological stability, filtration control, emulsion stability of wellbore fluids. VERSAWET®, which is commercially available from M-I LLC, Houston, Tex., is a further wetting agent and is especially effective in difficult to wet hematite systems. An example oil-based drilling fluid composition may optionally include from 0.1 wt. % to 2 wt. % of a wetting agent based on the total weight of the oil-based drilling fluid composition. In some embodiments, the oil-based drilling fluid composition may optionally include from 0.25 wt. % to 0.75 wt. % of each of SUREWET® based on the total weight of the oil-based drilling fluid composition. The oil-based drilling fluid composition may optionally include other suitable wetting agents without deviating from the scope of the present subject matter.

In one or more embodiments, fluid-loss control agents may be added to the oil-based drilling fluid composition to reduce the amount of filtrate lost from the oil-based drilling fluid composition into a subsurface formation. Examples of fluid-loss control agents include organophilic (for example, amine-treated) lignite, bentonite, manufactured polymers, and thinners or deflocculants. When fluid-loss control agents are used, they may comprise from 0.5 wt. % to 3 wt. % of the oil-based drilling fluid composition, based on the total weight of the drilling fluid. In various embodiments, fluid-loss control agents may comprise from 0.5 wt. % to 1.5 wt. %, 0.5 wt. % to 1.25 wt. %, 0.75 wt. % to 2 wt. %, 0.75 wt. % to 1.5 wt. %, 0.75 wt. % to 1.25 wt. %, 1 wt. % to 2 wt. %, 1 wt. % to 1.5 wt. %, or 1 wt. % to 1.25 wt. % of the oil-based drilling fluid composition, based on the total weight of the drilling fluid. Example fluid-loss control agents include VERSATROL™, VERSALIG™, ECOTROL™ RD, ONETROL™ HT, EMI 789, and NOVATECH™ F. all commercially available from MI SWACO, Houston, Tex. and ADAPTA® which is commercially available from Halliburton Energy Services, Inc. In some embodiments, the oil-based drilling fluid composition may optionally include both ONETROL™ HT and ECOTROL™ RD in about a 10:1 weight ratio, respectively.

Optional suspending agents may be added to the oil-based drilling fluid composition to adjust the viscosity of the oil-based drilling fluid composition to have a yield point at a low shear rate sufficient to suspend all of the drilling fluid components, by which the settling of components of the oil-based drilling fluid composition may be avoided. Examples of suspending agents include fatty acids and fibrous materials. When suspending agents are used, they may compose from about 0.0 wt. % to about 1.0 wt. % or 0.01 to 0.5 wt. % of the oil-based drilling fluid composition, based on the total weight of the drilling fluid.

According to one or more embodiments, to maintain suspension of solids and cuttings in the oil-based drilling fluid composition during low speed drilling or between drilling operations, viscosity above a threshold at lesser shear rates is advantageous. In one or more embodiments, the oil-based drilling fluid has a viscosity of at least 385 cP, at least 1000 cP, or even at least 1850 cP at a shear rate of 10.22 $s^{-1}$ measured at 50° C. or at 0° C. at atmospheric pressure.

According to one or more embodiments, to allow for the oil-based drilling fluid composition to circulate without a need for excessive energy, during viscosity below a threshold at greater shear rates is advantageous. In one or more embodiments, the oil-based drilling fluid has a viscosity of less than or equal to 222 cP, less than or equal to 175 cP, or even less than or equal to 128 cP at a shear rate of 170 $s^{-1}$ measured at 50° C. or at 0° C. at atmospheric pressure.

Having previously described the oil-based drilling fluid compositions according to various embodiments, illustrative methods for preparing the oil-based drilling fluid compositions will now be described. The methods for preparing the oil-based drilling fluids may include mixing a base oil, at least one emulsifier, and at least one wetting agent to form a first mixture, in which the at least one emulsifier comprises an amino amide comprising the formula R—CO—NH—R'—NH—R"—NH$_2$. The ingredients of the first mixture may be added to provide amounts previously described with regard to embodiments of the oil-based drilling fluid compositions. The methods for preparing the oil-based drilling fluid compositions may optionally include mixing at least one rheology modifier, such as Mg/Al-Myristate layered double hydroxide and alkalinity adjuster into the first mixture to form a second mixture. Again, the ingredients of the second mixture may be added to provide amounts previously described with regard to embodiments of the oil-based drilling fluid compositions. The methods for preparing the oil-based drilling fluid compositions may optionally include mixing at least one fluid-loss control additive into the second mixture to form a third mixture. Again, the ingredients of the third mixture may be added to provide amounts previously described with regard to embodiments of the oil-based drilling fluid compositions. The methods for preparing the oil-based drilling fluid compositions may further include mixing a brine solution into the first mixture or third mixture to form a fourth mixture. The ingredients of the fourth mixture may be added to provide amounts previously described with regard to embodiments of the oil-based drilling fluid compositions. The methods for preparing the oil-based drilling fluid compositions may further include mixing a weighting additive into the fourth mixture to form the oil-base drilling fluid composition. The ingredients of the oil-based drilling fluid composition may be added to provide amounts previously described with regard to embodiments of the oil-based drilling fluid compositions.

The oil-based drilling fluid compositions previously described, may be well-suited for use in drilling operations on subterranean formations, particularly for drilling operations performed under HPHT conditions of a wellbore pressure greater than 10,000 psi and a wellbore temperature greater than 300° F. (149° C.). Accordingly, embodiments of methods for drilling in a subterranean well under high-pressure high-temperature conditions may include providing an oil-based drilling fluid composition according to any embodiment described in this specification. The method for drilling in a subterranean well under high-pressure high-temperature conditions comprises operating a drill in a wellbore in the presence of the oil-based drilling fluid composition.

EXAMPLES

The following examples illustrate one or more additional features of the present disclosure. It should be understood that these examples are not intended to limit the scope of the disclosure or the appended claims in any manner.

The emulsifier of Chemical Structure 2 was synthesized by adding stearic acid (0.28 g, 1 mmol), boric acid (3.09 mg, 0.05 mmol) and toluene (3 ml) to a flask equipped with Dean-Stark trap topped with a reflux condenser. Diethylenetriamine (0.11 g, 1.1 mmol) was added to the reaction mixture under stirring. The reaction mixture was heated at reflux overnight (at least 14 hours). The mixture was allowed to cool to room temperature and then was poured with stirring into hexane leading to the immediate precipitation of a solid which was filtered off and washed with hexane to afford the desired amino amide emulsifier comprising the formula R—CO—NH—R'—NH—R"—NH$_2$ in accordance with embodiments of this disclosure.

Mg/Al-Myristate layered double hydroxide was produced. As starting materials, Mg(NO$_3$)$_2$.6H$_2$O, Al(NO$_3$)$_3$.9H$_2$O, urea, and sodium myristate were purchased from Sigma Aldrich and used without further purification. Purified water processed by a MilliQ® Water Purification System was used throughout the synthesis and water was decarbonated by heating at 75° C. to avoid any CO$_2$ contamination. To form the layered double hydroxide, 11.596 g of Mg(NO$_3$)$_2$.6H$_2$O, 8.35 g of Al(NO$_3$)$_3$.9H$_2$O and 12.16 g of urea were placed in a 1000 mL Teflon lined autoclave. The molar ratio of Mg/Al was 2, and the molar ratio of urea to metal was 3. To this mixture, 25.34 g of sodium myristate and 500 mL of hot decarbonated water was added to form a mixture having a molar ratio of myristate/metal of 1.5. The resultant reaction mixture was hydrothermally treated at 150° C. for 24 h. After the reaction, the entire product was dispersed in acetone and stirred for 30 min. at room temperature. The product was recovered by washing with copious amount of hot decarbonated water followed by heating at 75° C. in an oven for 24 h. Additionally, the Mg/Al-myristate layered double hydroxide was prepared by varying Mg/Al molar ratio of from 1 to 5, varying the heating temperature from 100° C. to 200° C.), and varying the reaction time from 6 h to 48 h.

To compare the physical and rheological properties of a drilling fluid containing the emulsifier of Chemical Structure 2 and Mg/Al-Myristate layered double hydroxide rheology modifier with those of a drilling fluid containing an industry standard emulsifier and rheology modifier, two drilling fluids were prepared. The two drilling fluids were based on the M-I SWACO RHADIANT™ system that includes a blend of proprietary emulsifiers, wetting agents, and fluid-loss control agents specially tailored for oil-based fluid formulations. Specifically, a comparative drilling fluid, Comparative Example A, was prepared using SUREMUL®, as an emulsifier and VERSAGEL HT and Bentone 42 as rheology modifiers. A second drilling fluid, Example 1, was prepared by replacing SUREMUL® with the emulsifier of Chemical Structure 2, and by replacing VERSAGEL HT and Bentone 42 with Mg/Al-Myristate layered double hydroxide. It is noted that the amount of total emulsifier in Example 1 is less than that in Comparative Example A, and the total amount of rheology modifier in Example 1 is less than that in Comparative Example A. Therefore, Example 1 would have better environmental characteristics than Comparative Example A.

The Comparative Example A and Example 1 drilling fluids were formulated using the following ingredients: Saraline 185V, a synthetic oil drilling base fluid, available from Shell; SUREMUL®, an amidoamine surfactant, available from M-I SWACO, LLC (Houston, Tex., USA); SUREWET®, a wetting agent, available from M-I SWACO, LLC (Houston, Tex., USA); MUL XT, an emulsifier for use in non-aqueous fluid systems, available from M-I SWACO, LLC (Houston, Tex., USA); VERSAGEL HT, a hectorite clay viscosifier for aiding in filtration control, available from M-I SWACO, LLC (Houston, Tex., USA); Bentone 42, a hectorite organoclay viscosifier available from Elementis Specialties, Inc. (East Windsor, N.J.); ONE-TROL™ HT, an amine-treated tannin filtration control additive designed for use in oil and synthetic-base drilling fluid systems, available from M-I SWACO, LLC (Houston, Tex., USA); ECOTROL RD, a filtration control additive designed for use in oil and synthetic-base drilling fluid systems, available from M-I SWACO, LLC (Houston, Tex., USA); and barite ($BaSO_4$) weighting agent, available from M-I SWACO, LLC (Houston, Tex., USA). Additionally, lime was utilized which has a specific gravity of 2.24 at 20° C. and a bulk density of 400 $kg/m^3$; $CaCl_2$ brine available from Schlumberger; and fresh water were included.

The Comparative Example A and Example 1 drilling fluids were prepared in 30.88 g and 25.27 g quantities, respectively, using a magnetic stir bar. The formulations for the Comparative Example A and Example 1 drilling fluids are provided in Table 1. To prepare the drilling fluids, the base oil, emulsifiers, and wetting agents were mixed together first for 10 minutes during stage 1. Specifically, SUREMUL® was added to Comparative Example A as an emulsifier and the Formula 1 emulsifier was added to Example 1 as an emulsifier. Then the rheology modifiers were added and mixed for another 20 minutes during stage 2, where Mg/Al-Myristate layered double hydroxide was utilized in Example 1 but not in Comparative Example A. Next, in stage 3 the fluid-loss control additives were added and mixed for 20 minutes, followed by brine and fresh water in stage 4 and barite in stage 5, which were mixed for 30 minutes and 40 minutes, respectively. The quantity of base oil used and barite as a wt. % were slightly different for Comparative Example A and Example 1 to provide a specific gravity of 2.20 and an oil/water ratio of 90.0, for both Comparative Example A and Example 1. It is noted that in the examples, the oil:water ratio does not include the oily portion of the layered double hydroxide.

TABLE 1

Formulation and Mixing Procedure for HPHT Oil-Based Drilling Fluids

| Ingredient | Function | Comparative Example A (wt. %) | Example 1 (wt. %) | Mixing Order and Time |
|---|---|---|---|---|
| Saraline 185V | Base Oil | 15.805 | 16.183 | Stage 1 (10 min) |
| SUREMUL | Emulsifier | 1.296 | 0.000 | |
| Chemical Structure 1 | Emulsifier | 0.000 | 0.782 | |
| SUREWET | Wetting Agent | 0.518 | 0.521 | |
| MUL XT | Emulsifier | 0.518 | 0.521 | |
| VERSAGEL HT | Rheology Modifier | 0.356 | 0.000 | Stage 2 (20 min) |
| Bentone 42 | Rheology Modifier | 0.356 | 0.000 | |
| Mg/Al-Myristate layered double hydroxide | Rheology Modifier | 0.000 | 0.359 | |
| Lime | pH Modifier | 0.777 | 0.782 | |
| ONE-TROL HT | Fluid Loss Control Additive | 1.036 | 1.043 | Stage 3 (20 min) |
| ECOTROL RD | Fluid Loss Control Additive | 0.104 | 0.104 | |
| $CaCl_2$ brine | Internal Phase | 3.692 | 3.756 | Stage 4 (30 min) |
| Fresh water | Internal Phase | 0.764 | 0.782 | |
| Barite | Weighting Agent | 74.777 | 75.164 | Stage 5 (40 min) |
| Total | | | | 120 min |
| Specific Gravity | | 2.20 | 2.20 | |
| Oil/Water Ratio (volumetric) | | 90.0 | 90.0 | |

The Comparative Example A and Example 1 drilling fluids were left statically after mixing for 17 hours and then were inspected for sagging and fluid separation prior to rheology measurements. Fluid separation and sagging were inspected visually. Specifically, inspection of visual separation of solids and liquid was undertaken. Sagging was also examined by inserting a micro spatula into the mud to check if the mud was of similar texture (subjectively hard or soft) throughout from top to bottom and if there was separation and settlement of solids such that solids were no longer homogenously distributed throughout the drilling fluid. If there was sagging, as evidenced by separation and settlement of the solids, then the mud would appear softer at the top and become harder at the bottom of the vessel in which the drilling fluid was statically left. As described, sagging refers to when solids settle down with increasing density, such as when heavier materials like barite move to the bottom, and may require vigorous mixing to disperse the solids back into solution. Fluid separation refers to fluid separating out at the top but the contents of the ingredients stay dispersed without heavy solids separating from the rest of the components and settling at the bottom.

The viscosities of the drilling fluids were tested using a stress and strain controlled rheometer (Discover Hybrid Rheometer from TA Instrument, New Castle, Del.). The geometry utilized in the rheometer was 25 mm rough stainless steel parallel plates. This geometry was selected due to the presence of the granular barite in the sample. The gap between the stainless steel plates was set at 300 μm. Viscosity measurements as a function of shear rate were carried out from 0.004 to 2000 $s^{-1}$ at 0° C. and 50° C. at atmospheric pressure. When no force was applied, the Comparative Example A and Example 1 drilling fluids gelled and were strong enough to hold drill solids and weighting materials such as barite. Additionally, shear rate experiments provide useful viscosity information of the fluid and whether the fluid has zero shears or is shear thinning. The shear rate experiments also indicated shear rate at which the drilling fluids deform.

Figure 1:
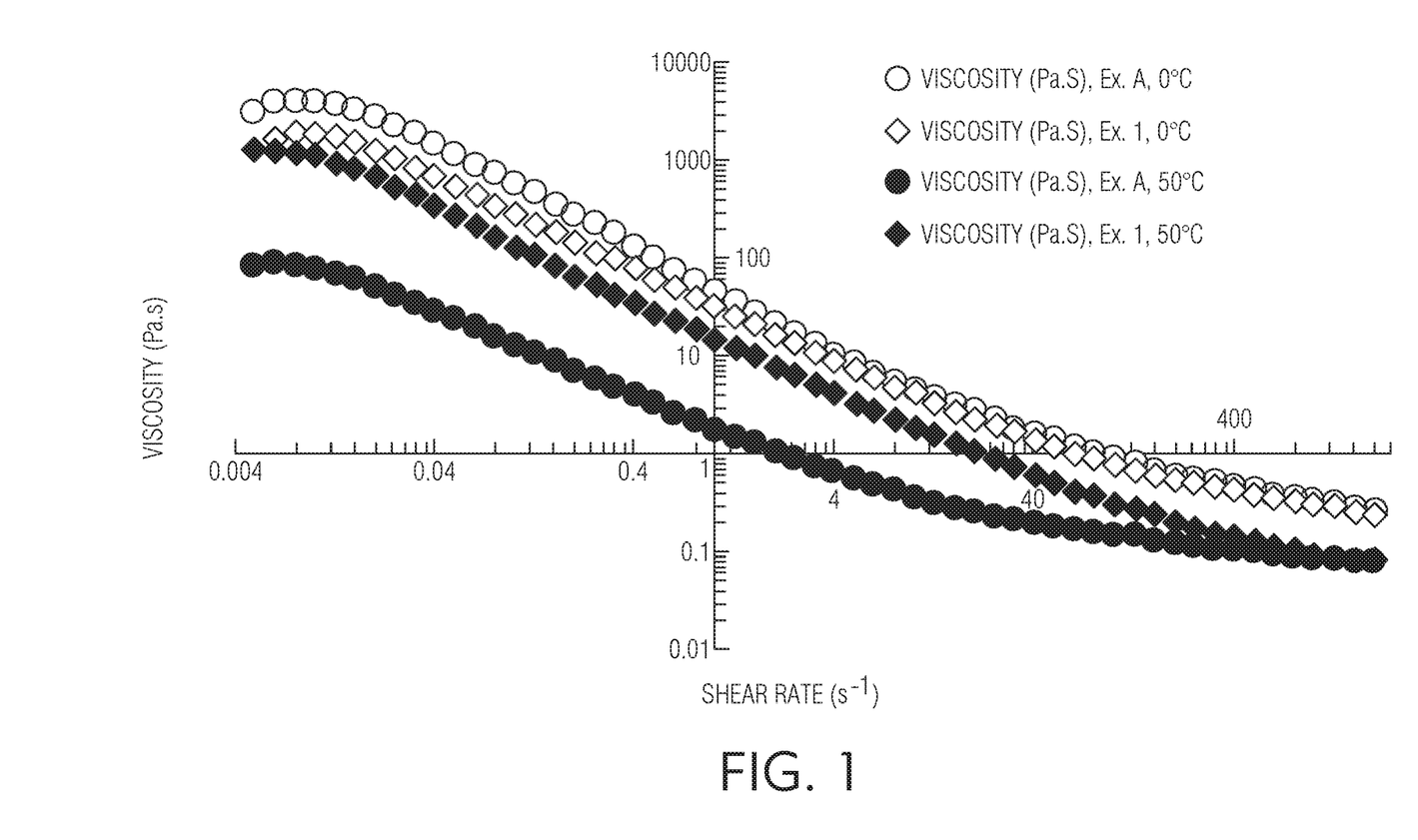
FIG. 1 is a graph depicting the viscosities of various tested drilling fluids as a function of shear rate at both 0° C. and 50° C., according to one or more embodiments presently disclosed.

FIG. 1 depicts the viscosity as a function of shear rate for the tested samples at 0° C. and 50° C. Additionally, selected results from the rheology measurements shown in FIG. 1

TABLE 2

HPHT Oil-Based Drilling Fluids Rheology

| Sample | Viscosity at shear rate of 10.22 $s^{-1}$ at 0° C. | Viscosity at shear rate of 170 $s^{-1}$ at 0° C. | Viscosity at shear rate of 10.22 $s^{-1}$ at 50° C. | Viscosity at shear rate of 170 $s^{-1}$ at 50° C. |
|---|---|---|---|---|
| Comparative Example A | 4280 Pa · s | 626 Pa · s | 358 Pa · s | 128 Pa · s |
| Example 1 | 4016 Pa · s | 601 Pa · s | 1850 Pa · s | 222 Pa · s |

With reference to FIG. 1 and Table 2, both Comparative Example A and Example 1 exhibited shear-thinning behavior regardless of their formulation and temperature at testing. However, at 50° C., Example 1 had greater viscosity at relatively low shear rates, such as 10.22 $s^{-1}$, than Comparative Example A at the same temperature and shear rate, thus allowing the Example 1 drilling fluid to better hold solids while stationary than the Comparative Example A drilling fluid at 50° C. However, at 50° C., Example 1 had a greater viscosity at a shear rate of 170 $s^{-1}$, meaning that additional energy would be required during fluid circulation. The relative viscosities of Example 1 and Comparative Example A at 50° C. indicates Example 1 would be better at holding solids while stationary as a result of the greater viscosities at low shear rates, but would require somewhat more power during drilling fluid circulation as a result of the greater viscosity at high shear rates when compared with Comparative Example A. Thus, if increased viscosity is needed for holding solids during stagnation periods, Example 1 drilling fluid may be superior to the Comparative Example A drilling fluid.

As shown in FIG. 1 and Table 2, the Example 1 drilling fluid had a lesser viscosity at 10.22 s$^{-1}$ at 0° C. than Comparative Example A drilling fluid, and also had a lesser viscosity at 170 s$^{-1}$ at 0° C. than Comparative Example A drilling fluid. Therefore, while the gel strength during stagnant periods of drilling would be slightly less for Example 1 as compared with Comparative Example A, the Example 1 drilling fluid would require less energy to circulate at 0° C. Thus, Example 1 drilling fluid may be superior to Comparative Example A drilling fluid at 0° C. as long as the viscosity of the Example 1 drilling fluid is acceptable for holding solids during stagnation.

Additionally, Example 1 drilling fluid showed characteristics of fragile gels, such that they would gel as soon as stress is removed. This correlates to a drilling fluid which would gel as soon as drilling is halted such that the drilling fluid would effectively support cuttings.

TABLE 3

Oil-Based Drilling Fluids: % Strain at Deformation and Fluid Separation

| Oil-Based Drilling Fluid | % Strain when deformed at 50° C. | Sagging | Fluid Separation |
|---|---|---|---|
| Comparative Example A | 0.399 | No | Trace |
| Example 1 | 0.401 | No | No |

Both Example 1 and Comparative Example A did not show sagging and demonstrated only trace or no separation after standing static for 17 hours after preparation. Both Example 1 and Comparative Example A deformed at approximately the same strain at 50° C., as shown in Table 3 and FIGS. 2-3, therefore both would require similar power to initiate drilling.

Figure 2:
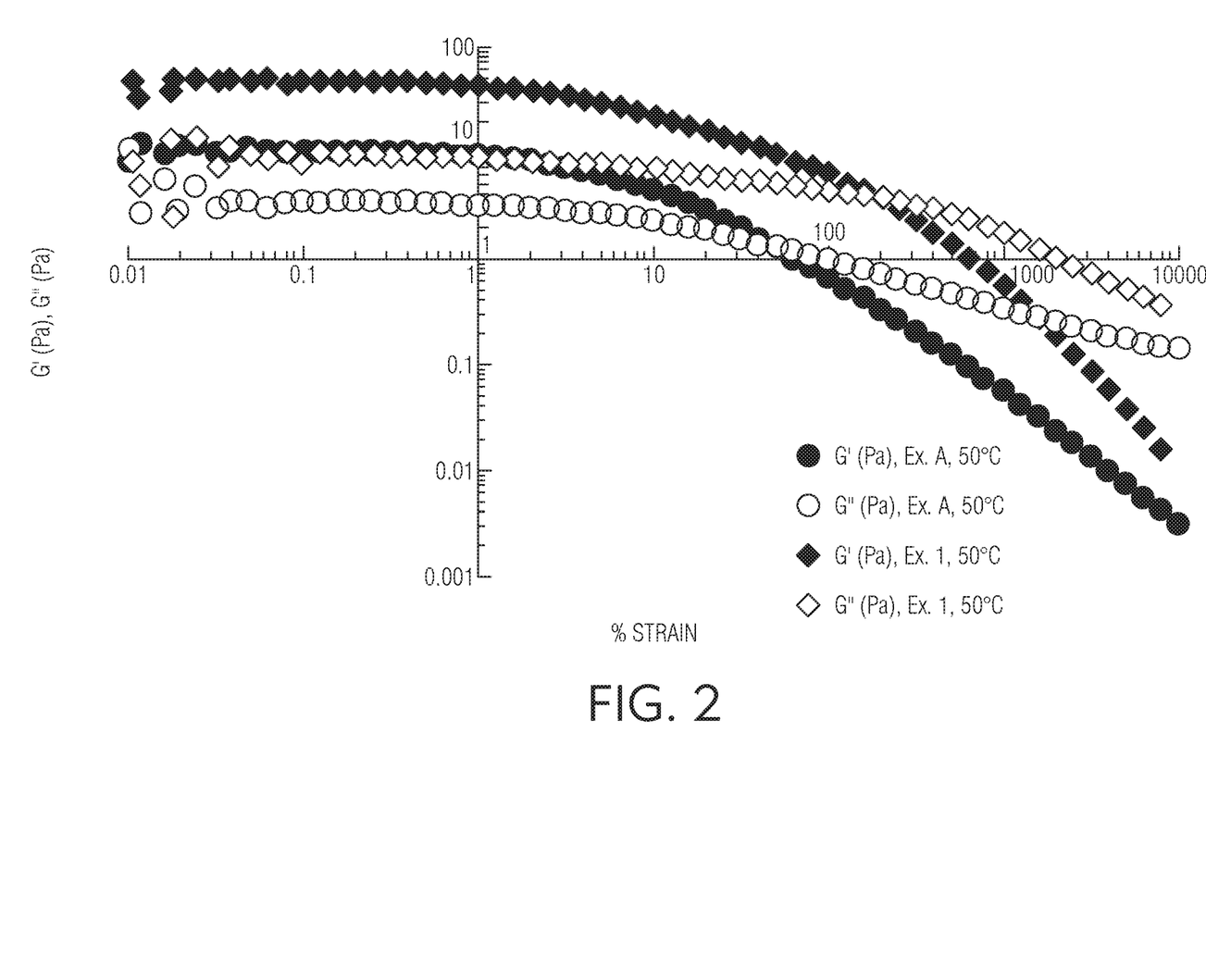
FIG. 2 is a graph depicting the storage modulus (G') and the loss modulus (G") of various tested drilling fluids as a function of percent strain at 50° C., according to one or more embodiments presently disclosed.
Figure 3:
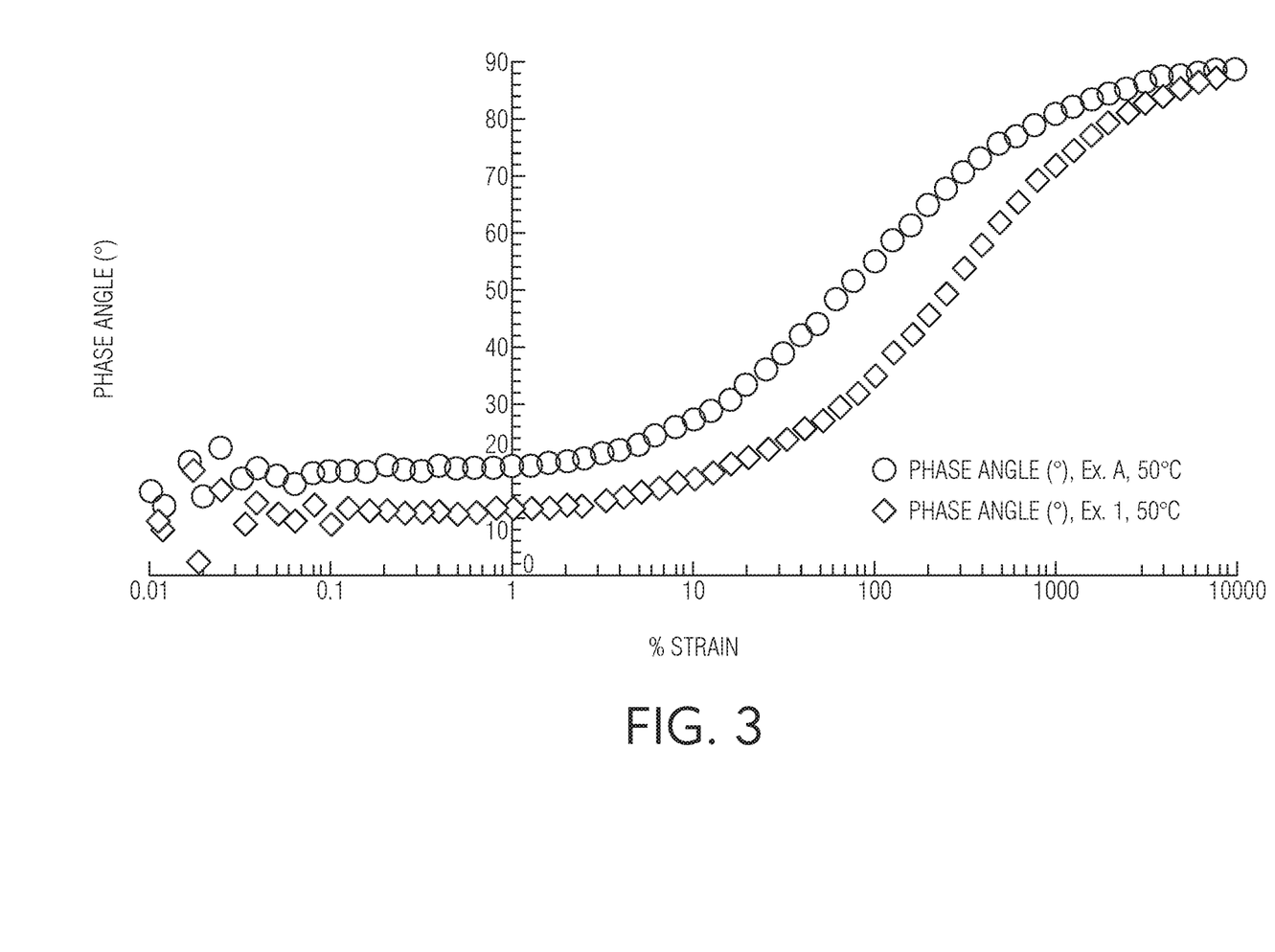
FIG. 3 is a graph depicting the phase angle of various tested drilling fluids as a function of percent strain at 50° C., according to one or more embodiments presently disclosed.

The storage modulus (G') and loss modulus (G") at 50° C. are depicted as a function of % strain in FIG. 2. Additionally, the phase angle at 50° C. as a function of % strain is depicted in FIG. 3. Storage modulus (G') of Example 1 was greater than the loss modulus (G"), indicating that it had solid-like properties like Comparative Example A. Comparative Example A had greater G' and G" values than Comparative Example A, but it deformed at slightly greater strains at 50° C. and, therefore, would not require excessive power to initiate the drilling but greater power would be required during the circulation as it remains in its semi-liquid state longer as its deformation to liquid state takes greater strains/shearing, hence more power. The phase angles of Example 1 drilling fluid showed behavior like solids at lesser strains and as liquids at greater strains, similar to the Comparative Example A drilling fluid. Greater strains were required before Example 1 drilling fluid started behaving like liquid at 50° C.

Additionally, it is contemplated that drilling fluids with reduced amounts of brine may have reduced viscosity, as it was observed during the preparation of the drilling fluids that the viscosity increased after brine was added. It is contemplated that brine reduction, or use of another brine such as NaCl, may reduce viscosity.

It should be noted that lesser total amount of emulsifier were utilized in Example 1 than in Comparative Example A. It is, therefore, contemplated, that Example 1 drilling fluid may be more environmentally friendly than Comparative Example A drilling fluid.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

It should be apparent to those skilled in the art that various modifications can be made to the described embodiments without departing from the spirit and scope of the claimed subject matter. Thus, it is intended that the specification cover the modifications and variations of the various described embodiments provided such modifications and variations are within the scope of the appended claims and their equivalents.

The presently described subject matter may include one or more aspects, which should not be regarded as limiting on the teachings of the present disclosure. A first aspect may include an oil-based drilling fluid composition comprising: base oil in an oil phase; water in an aqueous phase; a rheology modifier comprising a layered double hydroxide; an emulsifier comprising the formula R—CO—NH—R'—NH—R"—NH$_2$; and one or more additives chosen from wetting agents, fluid-loss control additives, and weighting additives.

A second aspect may include a method for making an oil-based drilling fluid composition comprising: mixing a base oil, a water-containing component, an emulsifier, and a rheology modifier to form an oil-based drilling fluid composition, where: the oil-based drilling fluid composition comprises an oil phase comprising the base oil and an aqueous phase comprising the water; the rheology modifier comprises a layered double hydroxide; and the emulsifier comprises an amino amide having the formula R—CO—NH—R'—NH—R"—NH$_2$.

A third aspect may include a method for drilling a subterranean well, the method comprising: providing an oil-based drilling fluid composition, where the oil-based drilling fluid composition comprises: base oil in an oil phase; water in an aqueous phase; rheology modifier comprising a layered double hydroxide; an emulsifier comprising an amino amide having the formula R—CO—NH—R'—NH—R"—NH$_2$, where R is a fatty acid alkyl group, R' is an alkyl group, and R" is an alkyl group; and one or more additives chosen from wetting agents, fluid-loss control additives, and weighting additives; and operating a drill in a wellbore in the presence of the oil-based drilling fluid composition.

Another aspect includes any of the previous aspects, where the oil-based drilling fluid comprises Mg/Al-Myristate layered double hydroxide in an amount of from 0.1 wt. % to 2 wt. % based on the total weight of the oil-based drilling fluid.

Another aspect includes any of the previous aspects, where the oil-based drilling fluid comprises the amino amide having the formula R—CO—NH—R'—NH—R"—NH$_2$ in an amount of from 0.1 wt. % to 5 wt. % based on the total weight of the oil-based drilling fluid.

Another aspect includes any of the previous aspects, where the oil-based drilling fluid comprises the base oil in an amount of from 10 wt. % to 20 wt. % based on the total weight of the oil-based drilling fluid.

Another aspect includes any of the previous aspects, where the oil-based drilling fluid comprises one or more wetting agents in an amount of from 0.1 wt. % to 2 wt. % based on the total weight of the oil-based drilling fluid.

Another aspect includes any of the previous aspects, where the oil-based drilling fluid comprises one or more fluid-loss control additives in an amount of from 0.5 wt. % to 2 wt. % based on the total weight of the oil-based drilling fluid.

Another aspect includes any of the previous aspects, where the oil-based drilling fluid comprises one or more weighting additives in an amount of from 50 wt. % to 90 wt. % based on the total weight of the oil-based drilling fluid.

Another aspect includes any of the previous aspects, where the layered double hydroxide comprises a myristate.

Another aspect includes any of the previous aspects, where the layered double hydroxide comprises Aluminum cations.

Another aspect includes any of the previous aspects, where the layered double hydroxide comprises Magnesium cations.

Another aspect includes any of the previous aspects, where the layered double hydroxide is Mg/Al-Myristate layered double hydroxide.

Another aspect includes any of the previous aspects, further comprising mixing one or more additives chosen from wetting agents, fluid-loss control additives, and weighting additives with the base oil, the water-containing component, the emulsifier, and the rheology modifier.

Another aspect includes any of the previous aspects, where the wellbore comprises a wellbore temperature greater than 300° F.

Another aspect includes any of the previous aspects, where the wellbore comprises a wellbore pressure greater than 10,000 psi.

Another aspect includes any of the previous aspects, where the surface temperature is 0° C. or less.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. An oil-based drilling fluid composition comprising:
    base oil in an oil phase;
    water in an aqueous phase;
    a rheology modifier comprising a layered double hydroxide;
    an emulsifier comprising the formula R—CO—NH—R'—NH—R"—NH$_2$; and
    one or more additives chosen from wetting agents, fluid-loss control additives, and weighting additives.

2. The oil-based drilling fluid composition of claim 1, where the oil-based drilling fluid comprises Mg/Al-Myristate layered double hydroxide in an amount of from 0.1 wt. % to 2 wt. % based on the total weight of the oil-based drilling fluid.

3. The oil-based drilling fluid composition of claim 1, where the oil-based drilling fluid comprises the amino amide having the formula R—CO—NH—R'—NH—R"—NH$_2$ in an amount of from 0.1 wt. % to 5 wt. % based on the total weight of the oil-based drilling fluid.

4. The oil-based drilling fluid composition of claim 1, where the oil-based drilling fluid comprises one or more of:
    the base oil in an amount of from 10 wt. % to 20 wt. % based on the total weight of the oil-based drilling fluid;
    one or more wetting agents in an amount of from 0.1 wt. % to 2 wt. % based on the total weight of the oil-based drilling fluid;
    one or more fluid-loss control additives in an amount of from 0.5 wt. % to 2 wt. % based on the total weight of the oil-based drilling fluid; or
    one or more weighting additives in an amount of from 50 wt. % to 90 wt. % based on the total weight of the oil-based drilling fluid.

5. The oil-based drilling fluid composition of claim 1, where the layered double hydroxide comprises a myristate.

6. The oil-based drilling fluid composition of claim 1, where the layered double hydroxide comprises one or more of Aluminum cations or Magnesium cations.

7. The oil-based drilling fluid composition of claim 1, where the layered double hydroxide is Mg/Al-Myristate layered double hydroxide.

8. A method for making an oil-based drilling fluid composition comprising:
    mixing a base oil, a water-containing component, an emulsifier, and a rheology modifier to form an oil-based drilling fluid composition, where:
        the oil-based drilling fluid composition comprises an oil phase comprising the base oil and an aqueous phase comprising the water;
        the rheology modifier comprises a layered double hydroxide; and
        the emulsifier comprises an amino amide having the formula R—CO—NH—R'—NH—R"—NH$_2$.

9. The method of claim 8, where the oil-based drilling fluid comprises Mg/Al-Myristate layered double hydroxide in an amount of from 0.1 wt. % to 2 wt. % based on the total weight of the oil-based drilling fluid.

10. The method of claim 8, where the oil-based drilling fluid comprises the amino amide having the formula R—CO—NH—R'—NH—R"—NH$_2$ in an amount of from 0.1 wt. % to 5 wt. % based on the total weight of the oil-based drilling fluid.

11. The method of claim 8, where the oil-based drilling fluid comprises one or more of:
   the base oil in an amount of from 10 wt. % to 20 wt. % based on the total weight of the oil-based drilling fluid;
   one or more wetting agents in an amount of from 0.1 wt. % to 2 wt. % based on the total weight of the oil-based drilling fluid;
   one or more fluid-loss control additives in an amount of from 0.5 wt. % to 2 wt. % based on the total weight of the oil-based drilling fluid; or
   one or more weighting additives in an amount of from 50 wt. % to 90 wt. % based on the total weight of the oil-based drilling fluid.

12. The method of claim 8, the method further comprising mixing one or more additives chosen from wetting agents, fluid-loss control additives, and weighting additives with the base oil, the water-containing component, the emulsifier, and the rheology modifier.

13. The method of claim 8, where the layered double hydroxide is Mg/Al-Myristate layered double hydroxide.

14. A method for drilling a subterranean well, the method comprising:
   providing an oil-based drilling fluid composition, where the oil-based drilling fluid composition comprises:
      base oil in an oil phase;
      water in an aqueous phase;
      rheology modifier comprising a layered double hydroxide;
      an emulsifier comprising an amino amide having the formula R—CO—NH—R'—NH—R"—NH$_2$, where R is a fatty acid alkyl group, R' is an alkyl group, and R" is an alkyl group; and
   one or more additives chosen from wetting agents, fluid-loss control additives, and weighting additives; and
   operating a drill in a wellbore in the presence of the oil-based drilling fluid composition.

15. The method of claim 14, where the wellbore comprises one or more of:
   a wellbore temperature greater than 300° F.;
   a pressure greater than 10,000 ps; or
   a surface temperature of 0° C. or less.

16. The method claim 14, where the oil-based drilling fluid comprises Mg/Al-Myristate layered double hydroxide in an amount of from 0.1 wt. % to 2 wt. % based on the total weight of the oil-based drilling fluid.

17. The method claim 14, where the oil-based drilling fluid comprises the amino amide having the formula R—CO—NH—R'—NH—R"—NH$_2$ in an amount of from 0.1 wt. % to 5 wt. % based on the total weight of the oil-based drilling fluid.

18. The method claim 14, where the oil-based drilling fluid comprises one or more of:
   the base oil in an amount of from 10 wt. % to 20 wt. % based on the total weight of the oil-based drilling fluid;
   comprises one or more wetting agents in an amount of from 0.1 wt. % to 2 wt. % based on the total weight of the oil-based drilling fluid;
   one or more fluid-loss control additives in an amount of from 0.5 wt. % to 2 wt. % based on the total weight of the oil-based drilling fluid; or
   one or more weighting additives in an amount of from 50 wt. % to 90 wt. % based on the total weight of the oil-based drilling fluid.

19. The method claim 14, where the layered double hydroxide comprises one or more of:
   a myristate; or
   one or more of Aluminum cations or Magnesium cations.

20. The method claim 14, where the layered double hydroxide is Mg/Al-Myristate layered double hydroxide.

* * * * *